United States Patent [19]

Sato

[11] Patent Number: 5,710,772

[45] Date of Patent: Jan. 20, 1998

[54] TDMA RADIO COMMUNICATION SYSTEM

[75] Inventor: Osamu Sato, Tokyo, Japan

[73] Assignee: NEC Corporation, Tokyo, Japan

[21] Appl. No.: 470,622

[22] Filed: Jun. 6, 1995

[30] Foreign Application Priority Data

Jun. 6, 1994 [JP] Japan .................... 6-123543

[51] Int. Cl.[6] ........................................ H04J 3/16
[52] U.S. Cl. .................. 370/458; 370/503; 455/67.3; 375/358
[58] Field of Search ................. 370/95.3, 95.1, 370/100.1, 18, 458, 503, 320, 342, 441, 479; 455/33.1, 33.2, 56.1, 67.3; 379/57, 58, 61; 375/219, 205, 358; 371/6

[56] References Cited

U.S. PATENT DOCUMENTS

| | | | |
|---|---|---|---|
| 3,789,142 | 1/1974 | Shimasaki et al. | 179/15 BS |
| 4,903,323 | 2/1990 | Hendershot | 455/67 |
| 5,239,557 | 8/1993 | Dent | 375/205 |
| 5,278,826 | 1/1994 | Murphy et al. | 370/18 |
| 5,341,379 | 8/1994 | Crisp | 371/6 |
| 5,383,221 | 1/1995 | Akita et al. | 375/219 |
| 5,423,071 | 6/1995 | Hanninen | 455/67.3 |
| 5,533,028 | 7/1996 | Hita de la Torre et al. | 370/95.3 |

FOREIGN PATENT DOCUMENTS

| | | | |
|---|---|---|---|
| 2 260 882 | 4/1993 | United Kingdom | H04M 1/72 |
| WO92/22963 | 12/1992 | WIPO | H04B 7/005 |

*Primary Examiner*—Douglas W. Olms
*Assistant Examiner*—Shick Hom
*Attorney, Agent, or Firm*—Scully, Scott, Murphy & Presser

[57] ABSTRACT

A mobile station sends a speech signal to a radio base station or, in the absence of speech signals, sends back a sync signal from the radio base station. The radio base station detects whether the signal received from the mobile station is a speech signal or the sync signal it sent. If a speech signal is received, it performs usual processing for speech signals or, if the sync signal is received, judges the line quality according to this sync signal.

17 Claims, 5 Drawing Sheets

TDMA RADIO COMMUNICATION SYSTEM

BACKGROUND OF THE INVENTION

1. Field of the Invention

The present invention relates to a time division multiple access (TDMA) radio communication system, and more particularly to a TDMA radio communication system which monitors the quality of the radio line connecting the radio base station and the mobile station, and switches the speech channel accordingly.

2. Description of the Related Art

In a cellular telephone system which uses a TDMA system to transmit and receive speech signals, the quality of the radio line is monitored by watching for communication errors caused on the mobile station side by multi-path fading or the like between the radio base station, or the cell base station, and the mobile station. Upon detecting a communication error, the radio base station changes the speech channel, and maintains the speech quality on that alternative channel.

Each time slot of the speech channel contains a synchronization (sync) signal for the training sequence and data bits. Data bits of an upstream signal, i.e. a signal transmitted from the mobile station to the radio base station, include speech bits of digitally coded speech information and line monitor bits. The mobile station detects such factors of the reception state as the receive field intensity, and sends these pieces of information to the radio base station by the line monitor bits. The radio base station switches the speech channel or cuts off the line according to the line monitor bits from the mobile station. Line monitoring to watch the line quality is thereby accomplished.

In digital TDMA communication, digitally coded speech signals are not consecutive but intermittent. For this reason, the mobile station detects the presence or absence of transmit speech signals. In their absence, the mobile station suspends uplink signals, and performs transmission only when any transmit speech signal has been detected. This arrangement is known as a discontinuous transmission (DTX) system. This DTX system serves to reduce power consumption at the mobile station, so that less power is consumed that when the duration of operation is extended.

In such a TDMA radio communication system, the mobile station suspends transmission to the radio base station during the absence of speech signals. Consequently, no line monitor bit is sent from the mobile station to the radio base station then. Therefore, line quality monitoring at the radio base station is made difficult in a sequence of communication having long silent periods.

To solve this problem, it is conceivable for the radio base station to request the transmission of line monitor bits at regular intervals and for the mobile station to respond to this request by transmitting upstream signals containing line monitor bits. Realization of this proposal, however, would involve complex controls at the radio base station and the mobile station. Moreover, if the intervals between requests for line monitor bit transmission are shortened to improve the accuracy of line quality monitoring, the mobile station will have to transmit more frequently with a corresponding increase in power consumption.

SUMMARY OF THE INVENTION

An object of the present invention is to provide a TDMA radio communication system which would solve the aforementioned problems.

Another object of the invention is to provide a TDMA radio communication system capable of simplifying line monitor control.

Still another object of the invention is to provide a TDMA radio communication system capable of saving power consumption at the mobile station.

According to the invention, there is provided a TDMA radio communication system whereby a radio base station and a mobile station transmit to and receive from each other digital speech signals over a radio line consisting of a plurality of time-divided time slots, wherein the mobile station has extracting circuit for extracting a first sync signal in signals from the radio base station; a detector for detecting the presence or absence of transmit speech signals; and a sending circuit for sending the first sync signal to the radio base station and, in the presence of the transmit speech signals, for sending the transmit speech signals.

The mobile station may further have a microphone and a converter for converting speech from the microphone into speech signals.

The sending circuit has a switch responsive to a switch control signal from the detector for switching between the transmit speech signals and the first sync signal.

The sending circuit has a transmitter for adding a second sync signal to the output signal of the switch and for sending the augmented signal.

The mobile station further has a memory unit for storing the first sync signal. The memory unit updates the stored contents every time the first sync signal is received from the radio base station.

According to the invention, there is also provided a TDMA radio communication system whereby a radio base station and a mobile station transmit to and receive from each other digital speech signals over a radio line consisting of a plurality of time-divided time slots, wherein the radio base station has a transmitter for transmitting a first sync signal; a receiver for receiving the first sync signal returned from the mobile station; and a judging circuit for judging the quality of the radio line according to the first sync signal.

The mobile station sends the first sync signal during silent periods.

The judging circuit calculates the bit error rate of the first sync signal, and judges the line quality according to the bit error rate.

The radio base station further has a receiver for receiving a second sync signal from the mobile station, and a detector for detecting the receive field intensity of the second sync signal.

The judging circuit judges the line quality according to the bit error rate of the first sync signal and the receive field intensity of the second sync signal.

The judging circuit judges the line quality according to said first sync signal and the bit error rate of said second sync signal from said mobile station.

According to the present invention, since a sync signal sent from the radio base station is sent back from the mobile station, the line quality can be judged according to this sync signal even during the absence of speech signals from the mobile station. Therefore, irrespective of the presence or absence of speech signals from the mobile station, the base radio station can monitor the line quality. Furthermore, as the radio base station sends no line monitor request signal, the processing at the radio base station and the mobile station is free from complexity. Moreover, since signals sent from the mobile station during silent periods are short, power consumption at the mobile station is not exorbitantly increased.

In addition, since the radio base station judges the line quality according to the latest sync signal returned from the mobile station, it can judge the latest line quality. As sync signals are used, no special signal is required for monitoring the line quality.

BRIEF DESCRIPTION OF THE DRAWINGS

These and other objects, features and advantages of the present invention will become more fully apparent from the following detailed description when taken in conjunction with the accompanying drawings, in which.

In the drawings, the same reference numerals denote the same structural elements.

DESCRIPTION OF THE PREFERRED EMBODIMENT

Figure 1A:
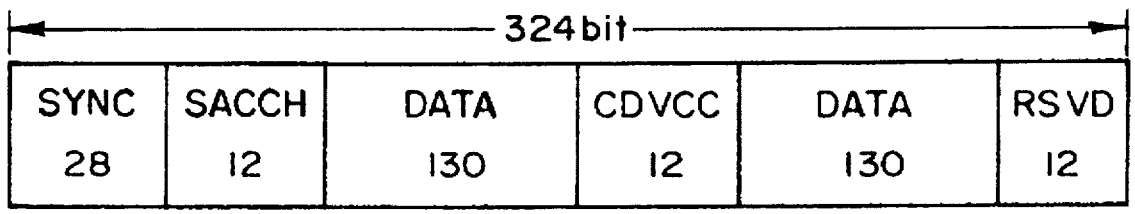
FIGS. 1 (a) through (c) illustrate the formats of TDMA time slots used in communication between the radio base station and the mobile station according to the invention.
Figure 1B:
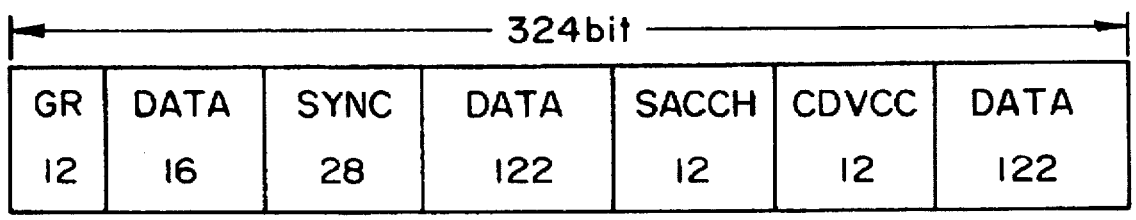

FIGS. 1 (a) through (c) illustrate the formats of TDMA time slots used in communication between the radio base station and the mobile station according to the invention, the TDMA time slots conforming to the EIA standard (IS-54).

FIG. 1 (a) illustrates the 324-bit time slot used for downlink signals from the radio base station to the mobile station. This downlink time slot is composed of a 28-bit sync signal SYNC, two 130-bit speech signals DATAs, and control signals SACCH, CDVCC and RSVD.

FIG. 1 (b) illustrates the 324-bit time slot used for uplink signals from the mobile station to the radio base station during active speech periods. This uplink time slot used during active speech periods is composed of 12 guard bits GR, 16-bit and two 122-bit speech signals DATA, a 28-bit sync signal SYNC, and control signals SACCH and CDVCC. The guard bits GR are added to guard, when the radio base station is to receive a transmit burst from the mobile station, the data after the receive rise time.

Figure 1C:
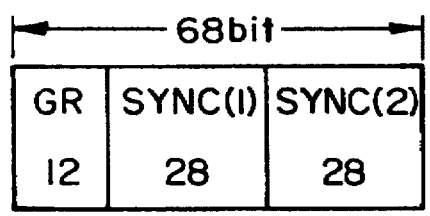

FIG. 1(c) illustrates the 68-bit time slot used for uplink signals from the mobile station to the radio base station during silent periods. This uplink time slot used during silent periods is composed of 12 guard bits GR, a 28-bit sync signal SYNC (1) and a 28-bit sync signal SYNC (2). The sync signal SYNC (2) is the latest sync signal transmitted from the radio base station and stored in the memory unit of the mobile station.

Figure 2:
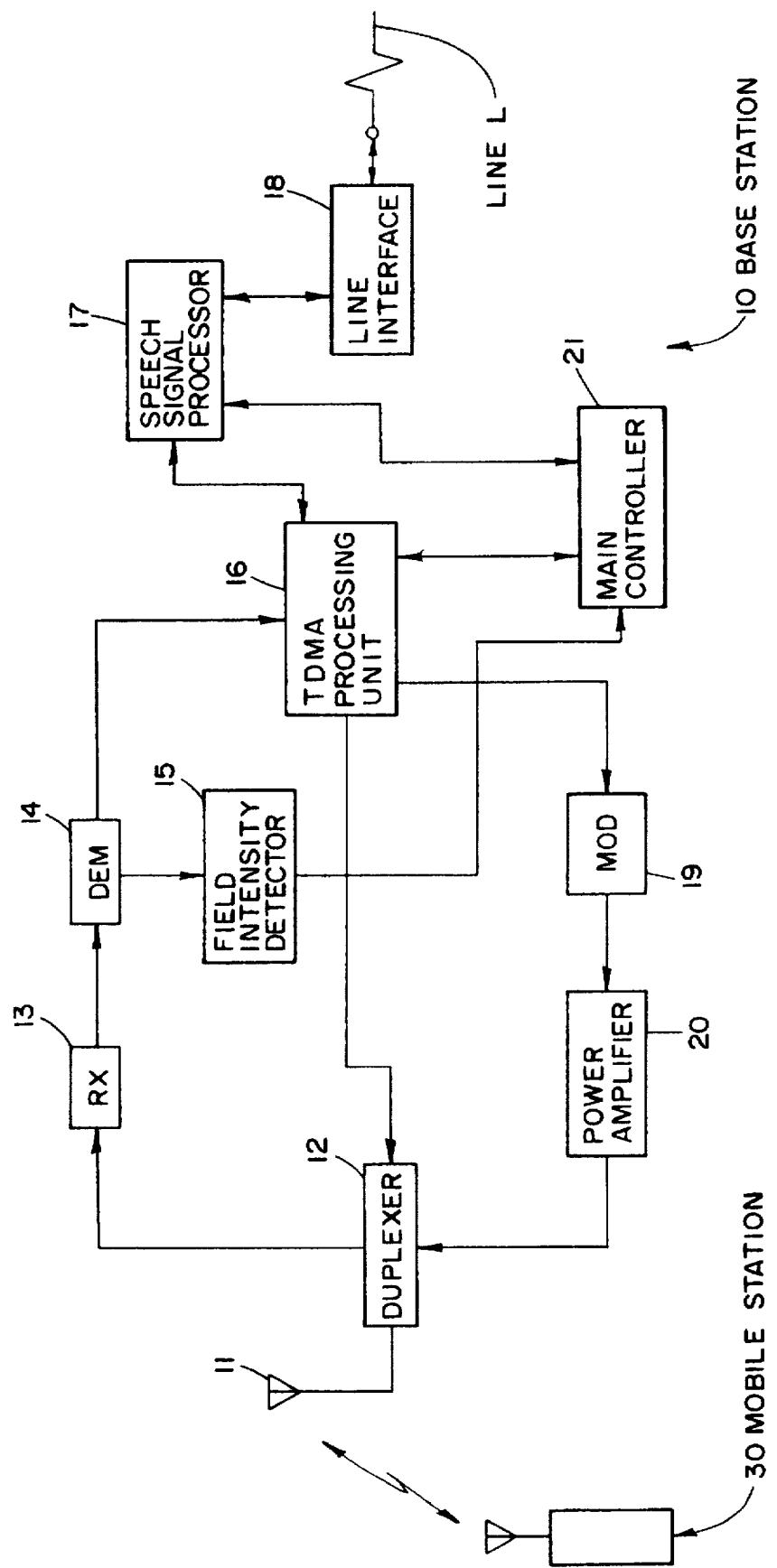
FIG. 2 is a block diagram illustrating the configuration of the radio base station in the TDMA radio communication system according to the invention.

FIG. 2 is a block diagram illustrating the configuration of the radio base station in the TDMA radio communication system according to the present invention. Referring to FIG. 2, the radio base station has an antenna 11, a duplexer 12, a receiver (RX) 13, a demodulator (DEM) 14, a field intensity detector 15, a TDMA processing unit 16, a speech signal processor 17, a line interface 18, a modulator (MOD) 19, a power amplifier 20 and a main controller 21. The radio base station 10 is connected to a public line network or a control station by a line L and to the mobile station 30 by a radio line.

Figure 3:
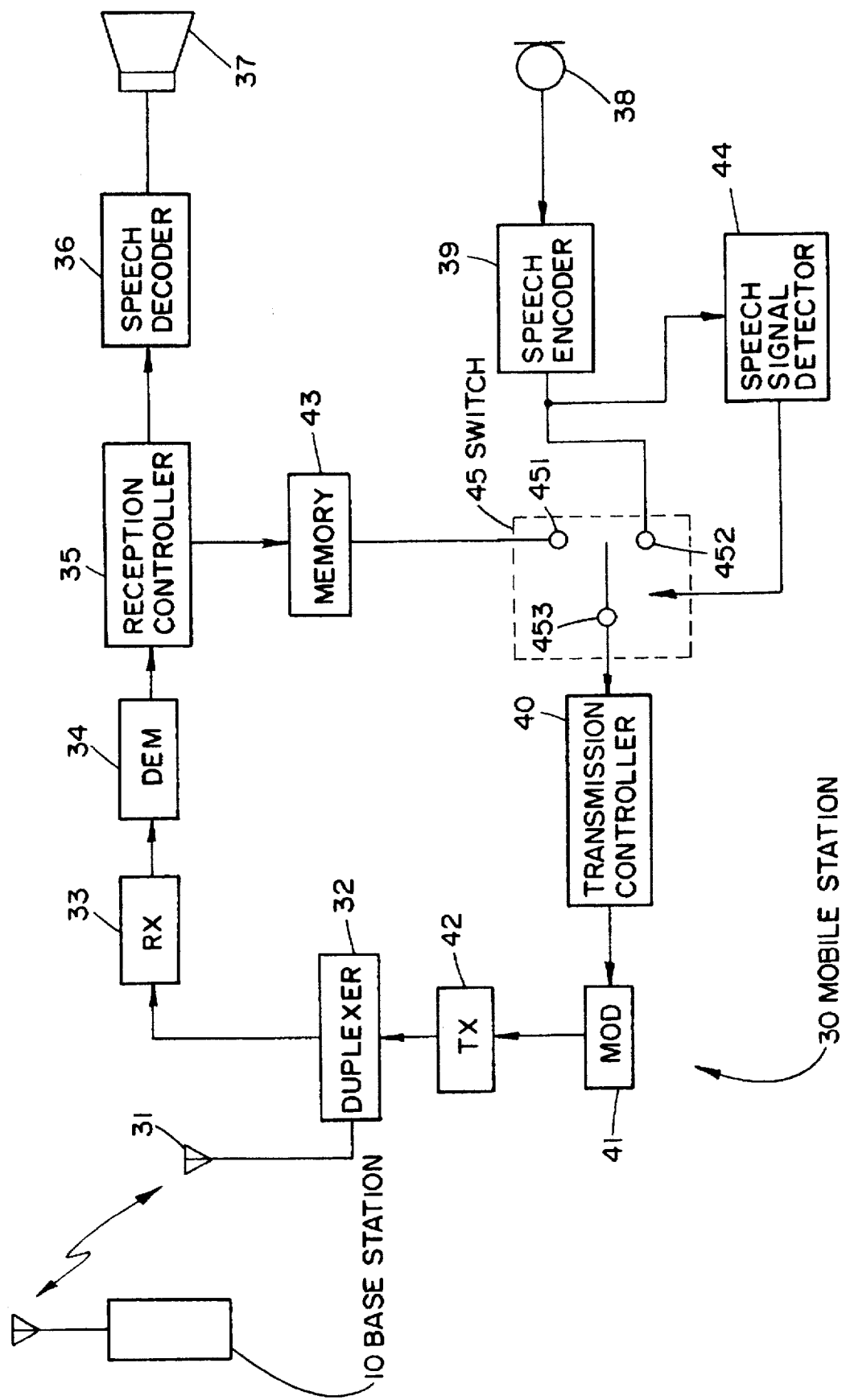
FIG. 3 is a block diagram illustrating the configuration of the mobile station in the TDMA radio communication system according to the invention.

FIG. 3 is a block diagram illustrating the configuration of the mobile station in the TDMA radio communication system according to the invention. Referring to FIG. 3, the mobile station 30 has an antenna 31, a duplexer 32, a receiver (RX) 33, a demodulator (DEM) 34, a reception controller 35, a speech decoder 36, a loudspeaker 37, a microphone 38, a speech encoder 39, a transmission controller 40, a modulator (MOD) 41, a transmitter (TX) 42, a memory 43, a speech signal detector 44 and a switch 45.

The operation of the present invention will be described in detail below with reference to FIGS. 1 through 3.

In the radio base station 10, transmit bursts, or uplink signals, from the mobile station 30 are supplied to the receiver 13 via the antenna 11 and the duplexer 12. The receiver 13 subjects the uplink signals to high frequency amplification, converts their frequency, subjects the frequency-converted signals to intermediate frequency amplification, and supplies the intermediate frequency signals to the demodulator 14. The demodulator 14 demodulates the intermediate frequency signals, and supplies the demodulated signals to the field intensity detector 15 and the TDMA processor 16. The TDMA processor 16 supplies the speech signal DATA and various control signals in the demodulated signals to the speech signal processor 17. The speech signal processor 17 converts the speech signal DATA into an analog speech signal. The line interface 18 sends the analog speech signal and the control signals to the line L, and connects the other party's telephone and the mobile station 30 via the public line network. The field intensity detector 15 detects the receive field intensity of the uplink signals, and supplies the detection information signal to the main controller 21. The main controller 21, which controls the TDMA processor 16 and the speech signal processor 17, detects the bit error rate of the sync signal SYNC (2), which is received internally. The main controller 21, in response to the detection information signal from the field intensity detector 15 and the bit error rate, judges whether or not the speech channel is to be changed. Thus, if the detection information is not above a predetermined threshold, it changes the speech channel.

Meanwhile, as an analog speech signal and control signals from the line L are inputted to the line interface 18, the line interface 18 supplies the analog speech signal and the control signals to the speech signal processor 17. The speech signal processor 17 converts the analog speech signal into a digital speech signal, and supplies the digital speech signal and the control signals to the TDMA processor 16. The TDMA processor 16 outputs the digital speech signal and the control signals at the timing of one time slot. The modulator 19 modulates the digital speech signal and the control signals from the TDMA processor 16, and supplies the modulated signals to the power amplifier 20. The power amplifier 20 converts the frequency of the modulated signals to a predetermined transmit frequency, and also amplifies the signals. The transmit signals subjected to amplification and frequency conversion by the power amplifier 20 are sent to the mobile station 30 via the duplexer 12 and the antenna 11.

In the mobile station 30, transmit bursts, or downlink signals, from the radio base station 10 are supplied to the receiver 33 via the antenna 31 and the duplexer 32. The receiver 33 subjects the downlink signals to high frequency amplification, frequency conversion and intermediate frequency amplification, and supplies the intermediate frequency signals to the demodulator 34. The demodulator 14 demodulates the intermediate frequency signals to the reception controller 35, which extracts the sync signal SYNC and the speech signal DATA in the demodulated signals. The speech decoder 36 converts the speech signal DATA into an analog speech signal. The loudspeaker 37, in response to the analog speech signal, outputs received speech. The memory 43 memorizes the sync signal SYNC, and updates the memorized contents every time the sync signal SYNC is entered.

Meanwhile, speech from the microphone 38 or a transmit signal is supplied to the speech encoder 39. The speech encoder 39 encodes the speech signal, and supplies a digital speech signal or a speech signal DATA to the transmission controller 40 via the switch 45. The transmission controller 40 adds the sync signal SYNC and the like to the speech signal DATA. The modulator 41 modulates the signals from the transmission controller 40, and outputs the modulated signals. The transmitter 42 subjects the modulated signals to frequency conversion and power amplification, and sends uplink signals to the radio base station 10 via the duplexer 32 and the antenna 31.

The speech signal detector 44, into which the speech signal DATA from the speech encoder 39 is entered, outputs a switch control signal to control the switch 45. The switch 45 has two input terminals 451 and 452 and one movable contact 453, which serves as an output terminal, and supplies one out of two inputs to the movable contact 453 in response to the switch control signal. To the input terminal 451 is supplied the sync signal SYNC from the radio base station 10, stored in the memory unit 43, while the speech signal DATA from the speech encoder 39 is supplied to the input terminal 452.

During transmission, in the absence of any transmit signal from the microphone 38, i.e. in a silent period, the sync signal SYNC from the radio base station 10, stored in the memory unit 43, is supplied to the transmission controller 40 via the input terminal 451 and the movable contact 453 of the switch 45. On the other hand, when there is any transmit signal, i.e. in an active speech period, a speech signal is supplied to the transmission controller 40 via the input terminal 452 and the movable contact 453 of the switch 45.

The speech signal detector 44 detects the presence or absence of any speech signal DATA from the speech encoder 39. The speech signal detector 44, in the presence of any speech signal DATA, outputs a switch control signal so as to connect the input terminal 452 to the movable contact 453, or in the absence of any speech signal DATA, outputs a switch control signal so as to connect the input terminal 451 to the movable contact 453.

Figure 4:
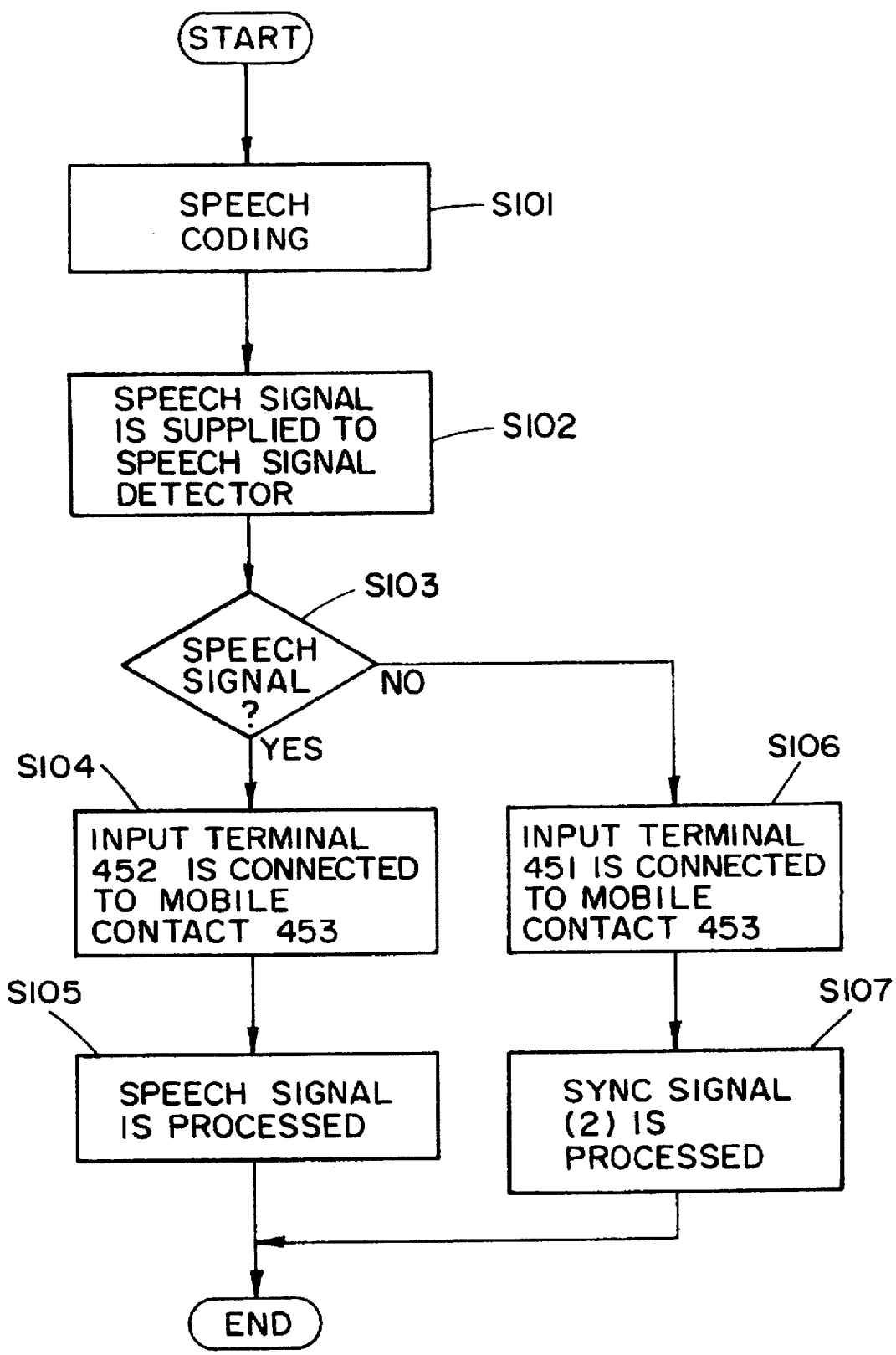
FIG. 4 is a flow chart illustrating the processing sequence of the operation to transmit one time slot at the mobile station shown in FIG. 3.

FIG. 4 is a flow chart illustrating the processing sequence of the operation to transmit one time slot at the mobile station 30.

The speech signal from the microphone 38 is encoded by the speech encoder 39 (step S101). The speech signal from the speech encoder 39 is supplied to the speech signal detector 44 (step S102), which judges whether or not there is any speech signal at the timing of one time slot (step S103). If a speech signal is detected, i.e. if the period is one of active speech, a switch control signal is supplied from the speech signal detecting unit 44 so that the input terminal 452 of the switch 45 be selected (step S104). That is to say, the movable contact 453 of the switch 45 is connected to the speech encoder 39. As a result, the speech signal from the speech encoder 39 is supplied to the transmission controller 40. This speech signal is processed for transmission by the transmission controller 40 by adding the sync signal and the control signals (step S105).

On the other hand, if no speech signal is detected at step S103, i.e. the period is a silent one, a switch control signal is supplied from the speech signal detector 44 so that the input terminal 451 of the switch 45 be selected (step S106). Namely, the movable contact 453 of the switch 45 is connected to the memory unit 43. As a result, the sync signal SYNC (2) from the radio base station 10, stored in the memory unit 43, is supplied to the transmission controller 40. This sync signal SYNC (2), together with the sync signal SYNC (1), is sent by the transmission control unit 40 to the radio base station 10 (step S107).

Figure 5:
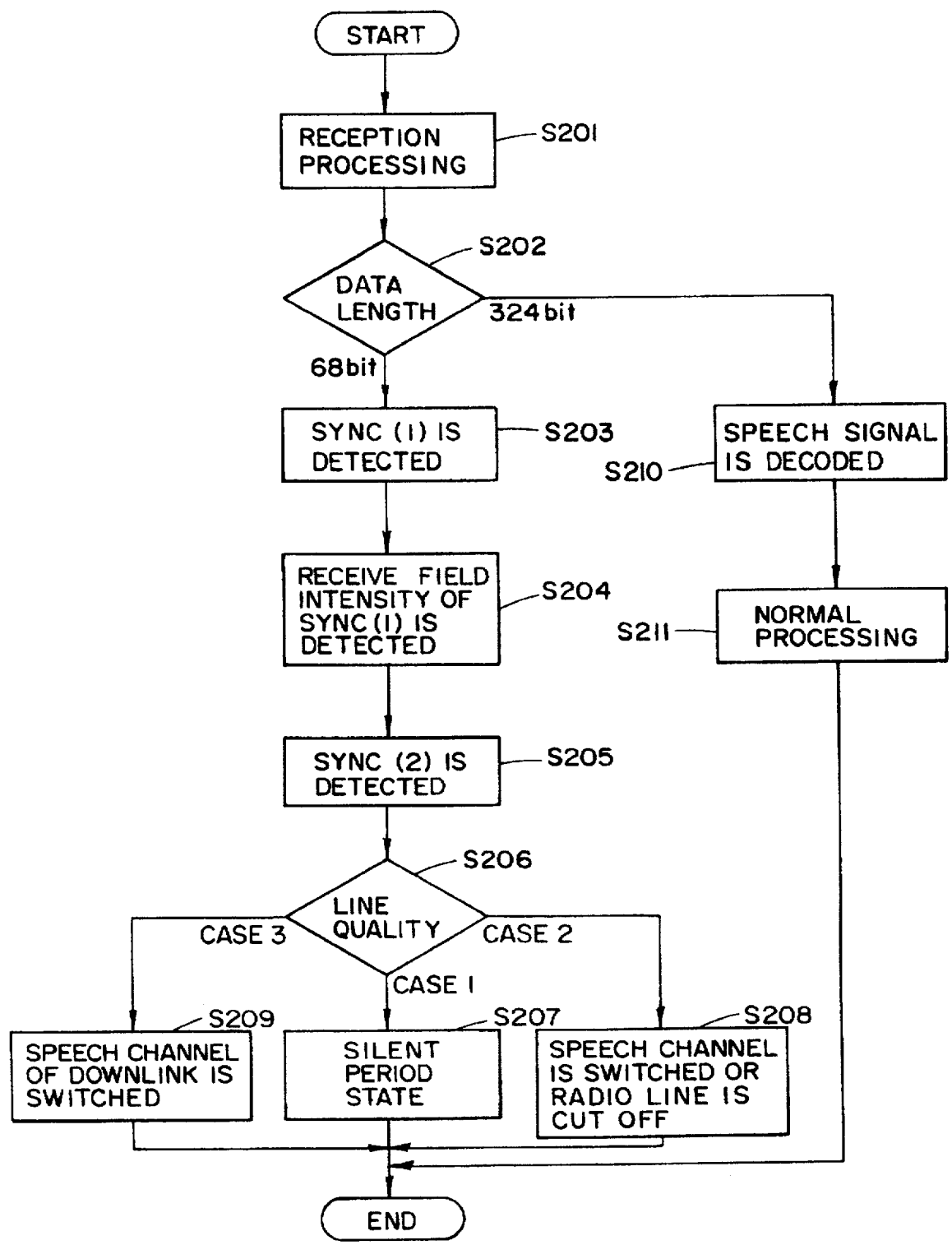
FIG. 5 is a flow chart illustrating the processing sequence of the receiving operation and the switching of radio channels at the radio base station shown in FIG. 2.

FIG. 5 is a flow chart illustrating the processing sequence of the receiving operation and the switching of radio channels at the radio base station 10.

Uplink signals from the mobile station 30 are processed for reception by the receiver 13 and the demodulator 14 as stated above (step S201). Then, the TDMA processor 16 and the main controller 21 judge whether the uplink signals represent a time slot in an active speech period or one in a silent period (step S202). This judgment is based on whether the data length of the time slot is 324 bits or 68 bits. Thus, if the data length of the time slot is 324 bits, the time slot is an active speech period, or if it is 68 bits, the period is a silent one (See FIGS. 1 (b) and (c)).

If at step S202 the data length of the time slot is found to be 68 bits, i.e. if it is a silent period, the sync signal SYNC (1) is detected by the demodulator 14 (step S203). The receive field intensity of the sync signal SYNC (1) is detected by the field intensity detector 15 (step S204). Then, the sync signal SYNC (2) is detected by the TDMA processor 16 and the main controller 21 (step S205). The main controller 21 calculates the bit error rate of the sync signal SYNC (2) by arithmetic operation, and judges the line quality according to the bit error rate and the field intensity (step S206). By this judgement of the line quality, the main controller 21 performs such controls as switching of the speech channel and, if speech connection is impossible, cut-off of the line.

If the receive field intensity of the sync signal SYNC (1) is not below a prescribed threshold and the bit error rate of the sync signal SYNC (2) is not below a prescribed threshold (case 1 of step S206), the radio base station 10 performs transmission indicating a silent period state to the radio line (step S207). If the receive field intensity of the sync signal SYNC (1) is below the prescribed threshold and the bit error rate of the sync signal SYNC (2) is below the prescribed threshold (case 2 of step S206), the radio base station 10 switches the speech channel or cuts off the line (step S208). If the receive field intensity of the sync signal SYNC (1) is not below the prescribed threshold and the bit error rate of the sync signal SYNC (2) is below the prescribed threshold (case 3 of step S206), it is judged that the quality of the downlink line has deteriorated. Accordingly, the main controller 21 switches the speech channel of the downlink line (step S209).

If at step S202 the data length of the time slot is found to be 324 bits, i.e. if it is an active speech period, the speech signal is decoded (step S210). The main controller 21 executes normal processing (the same as the conventional way) to monitor the line quality (step S211).

As hitherto described, according to the present invention, the radio base station can monitor the line quality irrespective of the presence or absence of speech signals from the microphone of the mobile station. Since the radio base station sends no line monitor request signal, the processing at the radio base station and the mobile station is free from complexity. Moreover, since signals sent from the mobile station during silent periods are short, power consumption at the mobile station is not exorbitantly increased.

In addition, since the radio base station judges the line quality according to the latest sync signal returned from the mobile station, it can judge the latest line quality. As sync signals are used, no special signal is required for monitoring the line quality.

Although the presence or absence of speech signals is judged according to the output signal of the speech encoder in the above-described embodiment, it can be judged by some other means.

Although the line quality is judged according to the receive field intensity of the sync signal from the mobile station and the bit error rate of the returned sync signal in the foregoing embodiment, it may as well be judged according to the bit error rates of both sync signals.

While the invention has been described with reference to a specific embodiment, it will be appreciated by those skilled in the art that numerous variations, modifications and other embodiments are possible and, accordingly, all such variations, modifications and other embodiments are to be regarded as being within the spirit and scope of the invention.

What is claimed is:

1. A TDMA radio communication system whereby a radio base station and a mobile station transmit to and receive from each other digital speech signals over a radio line consisting of a plurality of time-division-multiplexed time slots, said mobile station comprising:

extracting means for extracting a first sync signal from signals received from said radio base station;

detecting means for detecting the presence or absence of transmit speech signals; and sending means for sending said first sync signal to said radio base station in the absence of said transmit speech signals, and sending said transmit speech signals to said radio base station in the presence of said transmit speech signals.

2. The TDMA radio communication system, as claimed in claim 1, wherein said mobile station further comprises:

a microphone; and converting means for converting speech from said microphone into speech signals.

3. The TDMA radio communication system, as claimed in claim 2, wherein said transmit speech signals are said speech signals.

4. The TDMA radio communication system, as claimed in claim 1, wherein said sending means comprises:

a switch responsive to a switch control signal from said detecting means for switching between said transmit speech signals and said first sync signal.

5. The TDMA radio communication system, as claimed in claim 4, wherein said sending means comprises:

transmitting means for adding a second sync signal to the output signal of said switch and sending the augmented signal.

6. The TDMA radio communication system, as claimed in claim 4, wherein said mobile station comprises a memory for storing said first sync signal.

7. The TDMA radio communication system, as claimed in claim 6, wherein said memory is updated every time said first sync signal is received from said radio base station.

8. A TDMA radio communication system whereby a radio base station and a mobile station transmit to and receive from each other digital speech signals over a radio line consisting of a plurality of time-division-multiplexed time slots, said radio base station comprising:

transmitting means for transmitting a first sync signal;

first receiving means for receiving said first sync signal returned from said mobile station; and judging means for judging the quality of said radio line according to said first sync signal.

9. The TDMA radio communication system, as claimed in claim 8, wherein said mobile station sends said first sync signal during silent periods.

10. The TDMA radio communication system, as claimed in claim 8, wherein said judging means calculates the bit error rate of said first sync signal, and judges said radio line quality according to said bit error rate.

11. The TDMA radio communication system, as claimed in claim 8, said radio base station further comprising:

second receiving means for receiving a second sync signal from said mobile station, and detecting means for detecting the receive field intensity of said second sync signal.

12. The TDMA radio communication system, as claimed in claim 11, wherein said judging means judges said radio line quality according to the bit error rate of said first sync signal and the receive field intensity of said second sync signal.

13. The TDMA radio communication system, as claimed in claim 8, wherein said judging means judges said radio line quality according to said first sync signal and the bit error rate of said second sync signal from said mobile station.

14. In a TDMA radio communication system whereby a radio base station and a mobile station transmit to and receive from each other digital speech signals over a radio line consisting of a plurality of time-division-multiplexed time slots, a method for controlling transmission from said mobile station comprising the steps of:

detecting the presence or absence of transmit speech signals; and sending a sync signal received from said radio base station in the absence of said transmit speech signals and, in the presence of said transmit speech signals, sending said transmit speech signals.

15. The method claimed in claim 14, further comprising the steps of:

storing in memory said sync signal received from said radio base station; and updating said memory every time said sync signal is received.

16. In a TDMA radio communication system whereby a radio base station and a mobile station transmit to and receive from each other digital speech signals over a radio line consisting of a plurality of time-division-multiplexed time slots, a method for controlling transmission from said radio base station, comprising the steps of:

receiving signals from said mobile station;

judging whether or not said signals indicate a silent period, and judging, if they indicate a silent period, the line quality according to a first sync signal from said radio base station, contained in said signals or, if they do not indicate a silent period, processing speech signals contained in said signals.

17. The method claimed in claim 16, further comprising the steps of:

judging the reception state of a second sync signal generated by said mobile station and contained in signals from said mobile station; and executing line control according to judgment on said first sync signal and judgment on said second sync signal.

* * * * *